(No Model.)
S. R. V. ROBINSON.
VOLTAIC BATTERY.
No. 554,427.  Patented Feb. 11, 1896.
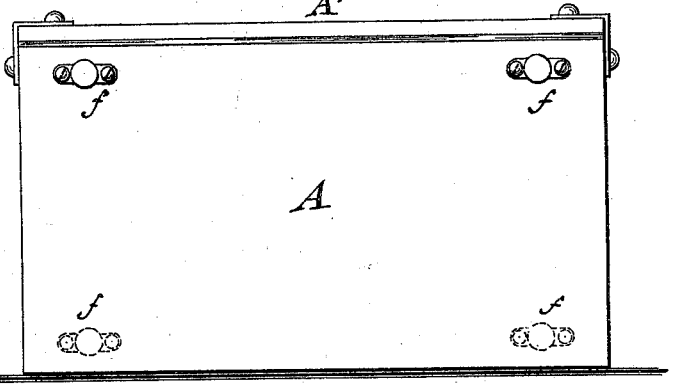
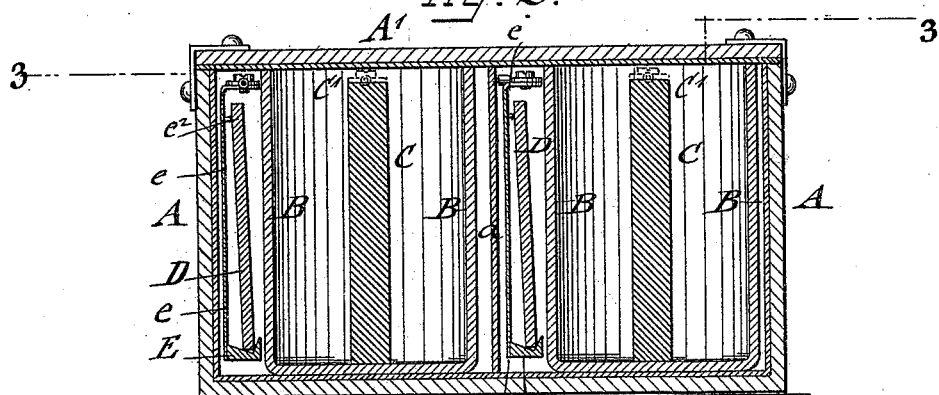
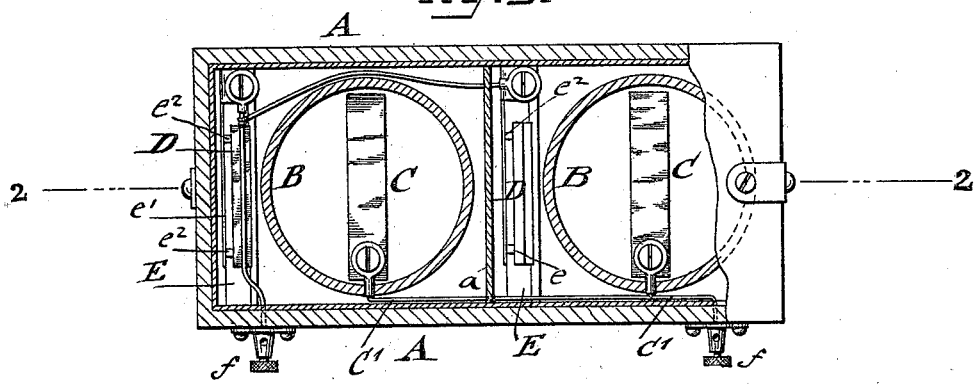
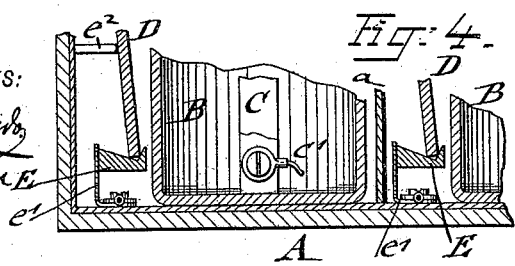
WITNESSES:
INVENTOR
Stanley R. V. Robinson
BY
ATTORNEYS.

UNITED STATES PATENT OFFICE.

STANLEY ROBERT VALENTINE ROBINSON, OF BROOKLYN, NEW YORK.

VOLTAIC BATTERY.

SPECIFICATION forming part of Letters Patent No. 554,427, dated February 11, 1896.

Application filed May 9, 1894. Serial No. 510,621. (No model.)

*To all whom it may concern:*

Be it known that I, STANLEY ROBERT VALENTINE ROBINSON, a subject of the Queen of Great Britain, residing in Brooklyn, in the county of Kings and State of New York, have invented certain new and useful Improvements in Voltaic Batteries, of which the following is a specification.

This invention has reference to certain improvements in voltaic batteries designed for reducing the local action in the battery; and the invention consists of an electric battery comprising a porous cup, a carbon in said porous cup, an exciting liquid at the inside and outside of said cup, and a zinc plate supported on a suitable platform at some distance from the bottom of the cell, as will be fully described hereinafter and finally pointed out in the claims.

In the accompanying drawings, Figure 1 represents a side elevation of my improved voltaic electric battery. Fig. 2 is a vertical longitudinal section on line 2 2, Fig. 3. Fig. 3 is a horizontal section on line 3 3, Fig. 2, partly in plan view; and Fig. 4 is a vertical longitudinal section of a portion of the battery, showing a modified arrangement of the zinc-supporting bracket.

Similar letters of reference indicate corresponding parts.

Referring to the drawings, A represents a wooden or other box which is covered at its inside with a suitable lining of gum or other acid-resisting material.

B is a porous cup, which is supported at the inside of the box A. The box A is provided with a rubber-lined cover A' that is secured to the body of the box by bolts or in any other suitable manner. The upper edge of the porous cup B is arranged to be flush with the top of the box A, so that the rubber-lined cover A' seals tightly both the box and cup.

A carbon plate C is arranged in the porous cup B and connected either at its upper or lower end by a copper, platinum, or other metallic conductor C'.

A zinc plate D, of straight or curved shape, according to the shape of the porous cup, is supported by a bracket E near the bottom of the box A and at such a distance from the same that the lower end of the zinc plate D is not less than one-twelfth of the height of the box from the bottom.

The porous cup C is charged with a suitable exciting solution, preferably with a saturated solution of nitrate of sodium, to which an equal part of sulphuric acid has been added. The space outside of the porous cup is charged with a dilute solution of sulphuric acid.

The bracket E, which supports the lower end of the zinc plate D, is suspended either by a hanger-plate $e$ from the upper part of the box, as shown in Fig. 2, or supported on a short upwardly-extending plate $e'$ on the bottom of the same, as shown in Fig. 4. In each case the upper or middle portion of the zinc plate D rests against studs $e^2$, which are attached to the hanger-plate or side wall of the box A, as shown in Figs. 2 and 4.

Brackets E, plates $e\ e'$ and studs $e^2$ are composed of a suitable non-conducting material, such as glass, wood, rubber, and the like.

The connections of the battery with the line-wires may be arranged either at the upper or lower part of the carbon and zinc plates according as the zinc-supporting bracket E is supported by the upper part or the bottom of the box A, the side connections passing through the side wall of the box to suitable binding-posts $f$ on the outside of the same, as shown in Fig. 1. Several cells may be arranged in one box and connected in series, or each cell may be made independently of the other, as desired. In the former case each cell is separated from the adjacent one by a partition $a$.

The advantages of my improved voltaic battery are that the local action is entirely prevented, as the zinc plate is supported at such a distance above the bottom of the box that it is above the concentrated acid that is settling at the bottom of the cell, whereby a more constant and effective battery is obtained.

Having thus described my invention, I claim as new and desire to secure by Letters Patent—

1. An electric battery, composed of an exterior box or cell, a porous cup supported on the bottom of said box, a carbon plate in the cup, a zinc plate outside of the cup, a bracket attached to one side of the exterior box and located at a short distance above the bottom of the box, said bracket constantly supporting the zinc plate by its lower end, an exciting solution in the cup and box respectively, and a rubber-lined cover fitting tightly onto the box and cup, substantially as set forth.

2. An electric battery, composed of an exterior box, a porous cup in the same, a rubber-lined cover fitting tightly on the box and cup, a carbon plate in the cup, a zinc plate outside of the cup, means for supporting the zinc plate at some distance from the bottom of the box, studs arranged near the upper portion of the zinc plate, and against which the same rests, and an exciting solution in the cup and box respectively, substantially as set forth.

In testimony that I claim the foregoing as my invention I have signed my name in presence of two subscribing witnesses.

STANLEY ROBERT VALENTINE ROBINSON.

Witnesses:
PAUL GOEPEL,
K. R. BRENNAN.